United States Patent
Babb et al.

(10) Patent No.: US 8,262,761 B2
(45) Date of Patent: Sep. 11, 2012

(54) MODULAR CYCLONE PRECLEANER SYSTEM AND METHOD

(75) Inventors: Kevin Brian Babb, Vicksburg, MI (US); Jeremy Metternich, Delray Beach, FL (US)

(73) Assignee: Mann + Hummel GmbH, Ludwigsburg (DE)

( * ) Notice: Subject to any disclaimer, the term of this patent is extended or adjusted under 35 U.S.C. 154(b) by 685 days.

(21) Appl. No.: 12/427,418

(22) Filed: Apr. 21, 2009

(65) Prior Publication Data

US 2010/0267540 A1 Oct. 21, 2010

(51) Int. Cl.
*B04C 3/04* (2006.01)
*B04C 3/06* (2006.01)
*B01D 45/12* (2006.01)

(52) U.S. Cl. ............... 55/346; 55/347; 55/348; 55/349; 29/525.11

(58) Field of Classification Search ............ 55/346–349; 29/525.11

See application file for complete search history.

(56) References Cited

U.S. PATENT DOCUMENTS

| | | |
|---|---|---|
| 4,008,059 A | 2/1977 | Monson et al. |
| 4,537,608 A | 8/1985 | Koslow |
| 4,746,340 A | 5/1988 | Durre et al. |
| 6,884,273 B2 | 4/2005 | Kopec et al. |
| 6,932,849 B2 * | 8/2005 | Sheidler et al. ............ 55/347 |
| 2008/0209869 A1 | 9/2008 | Rother et al. |

FOREIGN PATENT DOCUMENTS

| | | |
|---|---|---|
| EP | 1287896 | 3/2003 |
| EP | 1500423 | 1/2005 |
| WO | WO 2010121991 A1 * | 10/2010 |

OTHER PUBLICATIONS

The Written Opinion of PCT/EP2010/0055127, which published as WO 2010/121991 A1, Jul. 26, 2010.*
PCT search report and PCT opinion: PCT/EP2010/055127.

* cited by examiner

*Primary Examiner* — David A Reifsnyder
(74) *Attorney, Agent, or Firm* — James Hasselbeck

(57) ABSTRACT

A modular cyclone precleaner system includes one or more standardized and reusable modular cyclone blocks configured in parallel. The modular cyclone blocks are provided as components designed for reuse across differing precleaner systems for potentially different precleaner applications, providing standardized component building blocks and reducing manufacturing cost. The modular cyclone blocks are designed to be selectively combinable to provide a cyclone precleaner system having the required gas flow characteristics and particulate removal capabilities required for any given precleaner application. The precleaner system includes a housing that is sized for at least one given precleaner application and adapted to supportively receive the selectively combined modular cyclone blocks for the application.

9 Claims, 5 Drawing Sheets

MODULAR CYCLONE PRECLEANER SYSTEM AND METHOD

TECHNICAL FIELD

The present invention generally relates to modular cyclone precleaner systems built upon one or more standardized modular blocks of cyclone separator elements arranged to process flow in parallel. The invention also relates to a method for producing the precleaner systems built from these modular cyclone blocks.

BACKGROUND OF THE INVENTION

Cyclone separators frequently find application in the removal of solid particulates from air streams, examples including the intake systems of commercial and construction vehicles as well as air compressor intakes and various manufacturing and chemical processes. The cyclone separators of interest typically include a swirl inducing vane structure in the intake portion of the body. The swirl inducing vane structure induces a swirl or spin to the air stream that causes the outwards migration of entrained dust and particulates towards a flow tube wall due to the action of centrifugal forces on the swirling particulates. The cleaned gas then flows out of the center portion of the separator into a clean air take-off tube while centrifugal forces in the swirling gas cause dust and particulates to be ejected outwards through an annular gap or window in the wall of the cyclone separator.

Multicell cyclone separators are known in the art. For example, U.S. Pat. No. 6,884,273 discloses a multicell cyclone separator having groups of cyclonic cells arranged in parallel.

U.S. Pat. No. 4,008,059 discloses a cyclone separator for removing particulates entering an engine air cleaner.

U.S. Pat. No. 4,537,608 discloses a system for removing contaminant particles from a gas stream that includes a plurality of vortex air cleaners (cyclone separators) arranged side by side in two perpendicular rows.

US Publication 2008/0209869 A1 discloses a gas intake zone of a filter housing, which serves as a prefilter that includes a plurality of cyclone collectors arranged side by side. The cyclones are provided as a custom application specific unit.

As can be understood from the above, many varieties of cyclone precleaners are known to those skilled in the art. As can also be seen from the above prior art as well as the current state of the art, known precleaners utilize either individual cyclone cells or alternately a custom made cyclone block of cells in a custom housing, both being designed and adapted for a specific intended application. These individual cyclone cells are typically injection molded and subsequently pressed into steel or plastic plates. Typically these cells eject contaminants through an annular gap or radially outwards through a window or opening in the cyclone cell.

SUMMARY OF THE INVENTION

In one aspect of the invention a modular cyclone precleaner system includes at least one modular cyclone block configured to remove particulates from an air stream. In the present invention, modular cyclone blocks are provided as components designed for reuse across differing precleaner systems for potentially different precleaner applications. Modular cyclone blocks include one or more cyclone separator cells arranged in parallel and configured to swirl a gas stream for removal of contaminants by centrifugal force. Each cyclone separator cell has a cyclone housing with a particulate discharge port for particulates removed from the intake gas stream. Modular cyclone blocks are configured into standardized sizes and cyclone cell configurations (number and type of cyclones on a block). The modular cyclone blocks are designed to be selectively combinable to thereby provide a cyclone precleaner system having the required gas flow characteristics and particulate removal capabilities required for any given precleaner application. The precleaner system may include a housing that is sized for at least one given precleaner application and adapted to supportively receive the selectively combined modular cyclone blocks for the application. The modular precleaner system is configurable and adaptable to other applications by adapting the housing while reusing a sufficient number and type and sizes of modular cyclone blocks, as determined by the requirements of the application.

In another aspect of the invention, the housing further includes a first housing half and a symmetric mating second housing half. The housing halves, when mated, are configured and adapted to form a particulate collection chamber therein and a particulate outlet in the housing. The housing is configured to capture particulates from the discharge ports of the cyclone separators. Advantageously, the housing halves are symmetric and interchangeable, enabling the halves to be produced by the same mold.

In another aspect of the invention, at least one of the modular cyclone blocks includes a ramped skirt provided on an interior facing portion of the block. The ramped skirt is configured to channel particulates towards a side region of the modular cyclone block and therefore away from the cyclone separator cells of the modular block.

In another aspect of the invention, the cyclone separator cells each include an upstream end for receiving a particulate laden intake gas stream, a downstream end for discharging a cleaned output gas stream and a swirl inducing structure for imparting centrifugal forces onto the particulates in the intake gas stream.

Additionally, a method is disclosed for producing a precleaner system from a defined universe of modular cyclone block types. The method includes choosing types and quantities of modular cyclone blocks for the precleaner from the predefined universe of blocks according to air flow and particulate removal requirements of an application. Then a housing is designed and produced to supportively receive the chosen modular cyclone blocks. The modular cyclone blocks are then installed into the housing to form a completed modular precleaner system.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

The present invention generally relates to modular cyclone precleaner systems built upon one or more standardized reusable modular blocks, each block having one or more cyclone separator elements arranged to process an air stream in a parallel fashion for removal of entrained particulates. In the current state of the art, cyclone precleaners utilize either individual cyclone cells or a custom cyclone block of cyclone cells in a custom housing, typically directly attached to the air filter housing. In the prior art the precleaner and cyclones are custom shaped and sized to meet the geometry, airflow and particulate removal requirements of each intended application. While such known designs provide a workable solution, custom precleaner designs of the prior art suffer from significant tooling and production costs. Further, these known custom designs limit the reuse of precleaner system components between differing applications.

To overcome these issues advantageously, the present invention provides a modular cyclone precleaner system in which precleaner systems for new applications are built up from standardized pre-engineered modular cyclone blocks with each block having one or more cyclone separator cells. Advantageously, each new precleaner application may utilize a custom housing while precleaner system cost reductions and production efficiencies accrue from the reuse of standardized modular cyclone blocks. The reuse of standardized modular cyclone blocks permits tooling and development costs to be reduced and also spread over a greater number of precleaner designs and customer applications.

In the present invention standard size modular cyclone blocks may be produced and then made available from production stores as "off the shelf" components. It is anticipated and intended that modular cyclone blocks be provided in a variety of sizes, differing according to desired flow rate, particulate removal requirements, physical block size, materials and other factors as required to meet a wide variety of specifications of precleaner applications. A specific precleaner housing is designed to receive the required number and type of modular cyclone blocks. The housing may be a customized housing designed and adapted to fit the geometric requirements of the intended application, adapting standardized modular cyclone blocks to fit the specific geometric interface requirements of the end application to provide a successful precleaner unit.

Figure 1A:
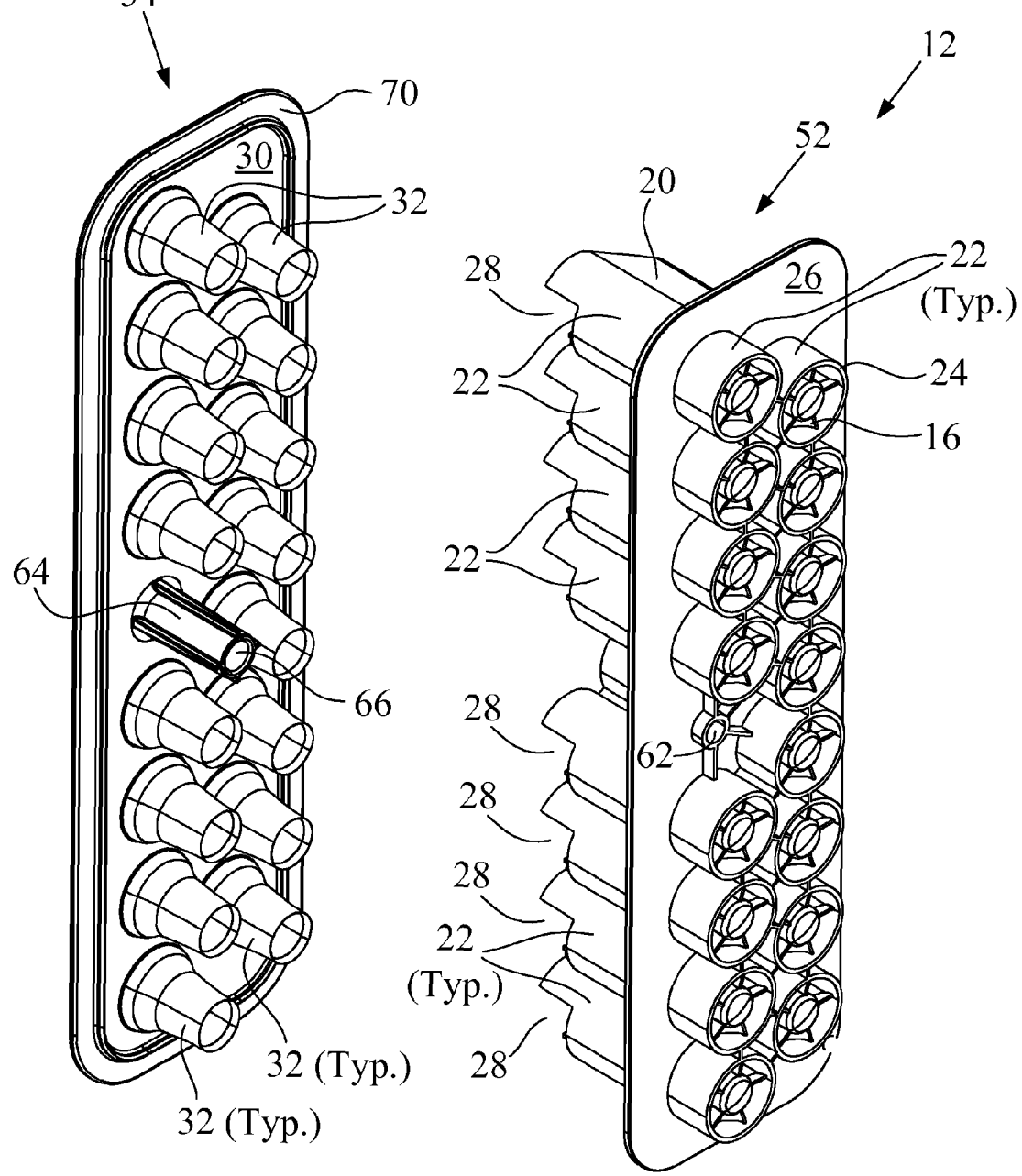
FIG. 1A is an exploded view of one embodiment of a reusable modular cyclone block having a plurality of cyclone separator cells and a ramped skirt feature for deflecting debris, consistent with the present invention.
Figure 2:
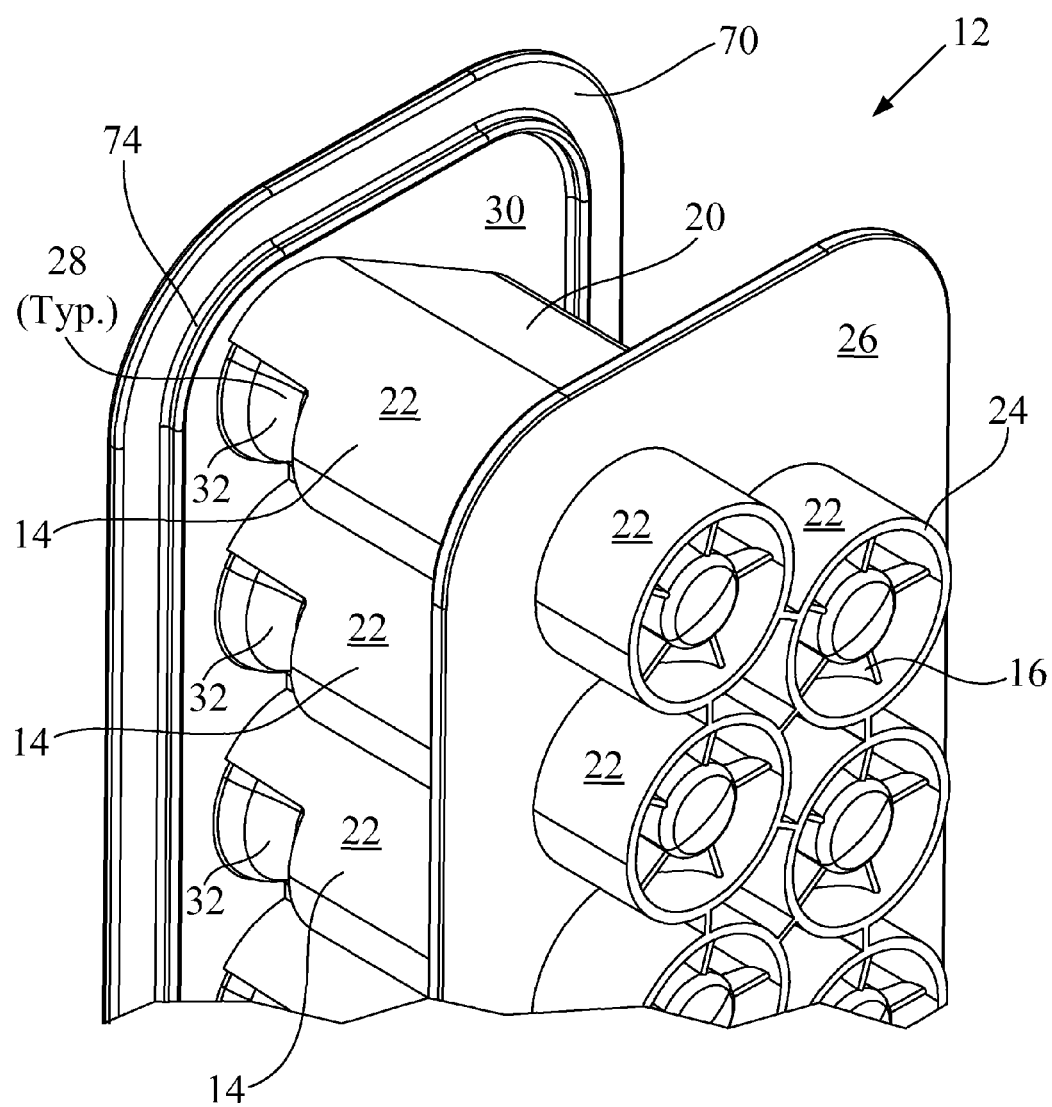
FIG. 2 illustrates a perspective view of an upper portion of one embodiment of an assembled modular cyclone block, consistent with the present invention.

FIG. 1A illustrates an exploded view of one embodiment of the present invention in which an exemplary standardized size modular cyclone block 12 has sixteen cyclones separator cells arranged to process particulate laden air flow in parallel and includes a ramped skirt 20 for deflecting debris from the vicinity of the cyclone separator cells 14 (see FIG. 2). In the specific aspect of the invention illustrated in FIG. 1A, the circular flow tubes 22 are provided on and formed or molded in one piece with the upstream support plate 26, such as by an injection molding process. In other aspects of the invention, the complete cyclone separator cells or cell components such as the circular flow tubes 22 may be molded separately and then secured to the upstream support plate 26 by any variety of means known to those skilled in the art, including adhesives, friction welding, laser welding or by a snap-in insertion method.

As illustrated in FIG. 1A, each cyclone cell includes a particulate discharge port 28 through which particulates removed by the cyclone cell 14 are forcibly ejected due to the action of centrifugal force on the swirling gas stream in each cyclone cell 14.

In the specific illustrated embodiment, the modular cyclone block 12 includes a downstream plate 30 onto which are formed a plurality of clean air take off tubes 32. Each tube 32 is sized and axially aligned with its corresponding circular flow tube 22 so as to be axially received at least partially into the interior of its corresponding circular flow tube 22. In FIG. 1A the clean air take off tubes 32 are formed or molded in one piece with the downstream support plate 30, such as by an injection molding process. In other aspects of the invention, the clean air take off tubes 32 may be molded separately and then secured to the downstream support plate 30 by any variety of means known to those skilled in the art, including adhesives, friction welding, laser welding or by a snap-in insertion method. In other embodiments, complete cyclone cells may be provided and individually secured to the downstream support plate 30 by any variety of means known to those skilled in the art, such as the means described above.

Figure 1B:
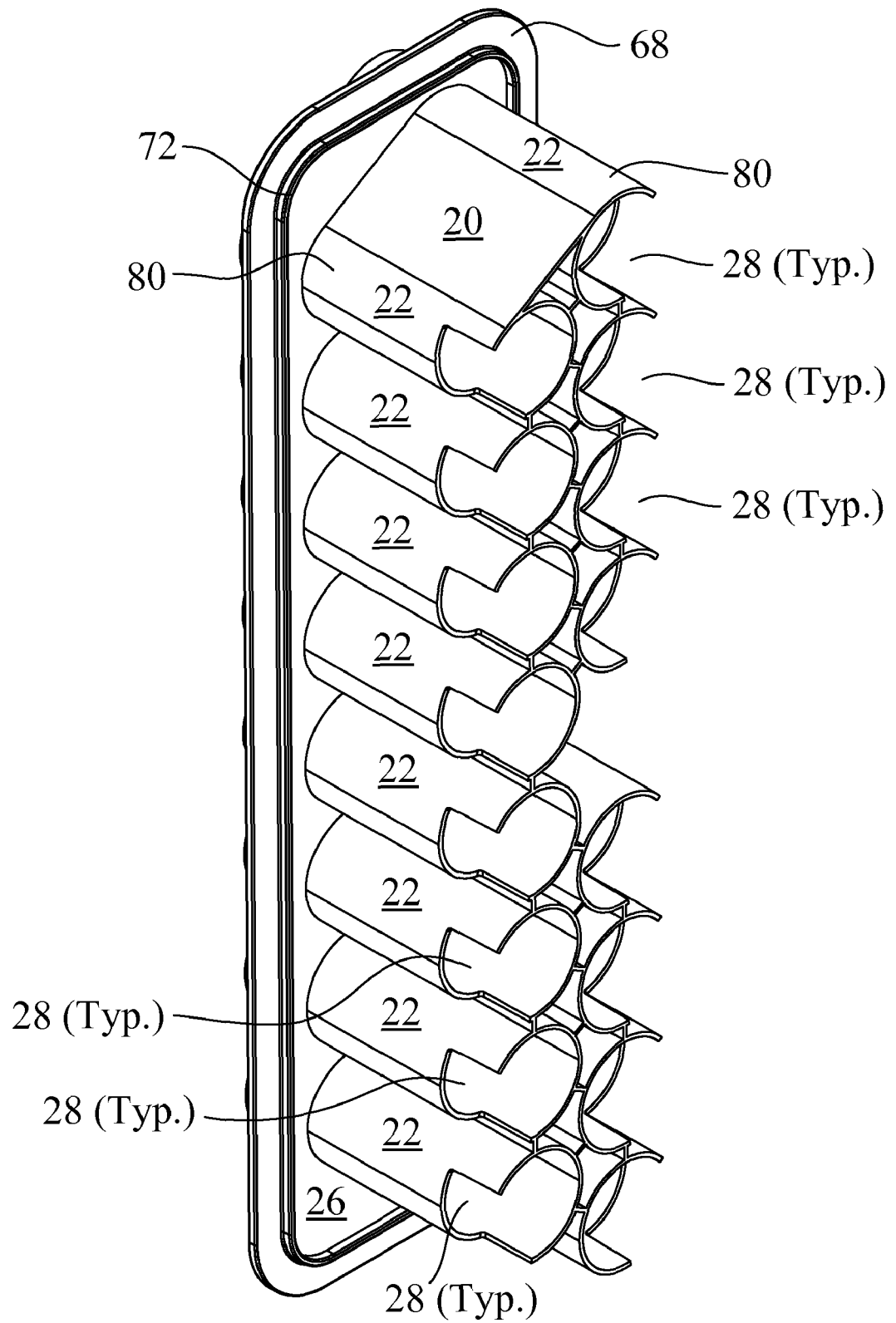
FIG. 1B depicts an inside perspective view of one embodiment of an upstream portion of the upstream support plate and modular cyclone cells as in FIG. 1 illustrating the ramped skirt feature as well as the particulate discharge portions of the cyclone separator cells, consistent with the present invention.

FIG. 1B depicts an inside perspective view of one embodiment of the upstream support plate 26 including the circular flow tubes 22 of the modular cyclone cells 14 as in FIG. 1A. FIG. 1B more clearly illustrates the ramped skirt feature 20 as well as the particulate discharge ports 28 of the cyclone separator cells. In the illustrated embodiment, the ramped skirt 20 is provided between the two top-most cyclone separator cells and is smoothly formed to bridge between and tangentially intersect the topmost circular flow tubes 80. Advantageously, the horizontal location of cyclone separator cells (indicated by circular flow tubes 22) in neighboring columns are horizontally offset or staggered to provide a higher flow capacity in a smaller size block while additionally providing an angled slope to the ramped skirt 20 so as to aid in shedding downwards falling debris impinging upon the ramped slope 20 towards a side (in FIG. 1B this would be the nearest side to the observer) of the modular cyclone block 12.

In the illustrated embodiment, the upstream support plate 26 includes a seal flange 68 provided circumferentially around the perimeter of the upstream support plate 26. Advantageously, a step 72 is provided on boundary between the seal flange 68 and the upstream support plate 26, the step permitting the upstream support plate to be closely fitted into a modular cyclone block receiving opening in the precleaner housing (such as the housing illustrated in FIG. 3). While the step 72 and seal flange 68 are presented as the exemplary attachment means in FIG. 1B, the invention is not limited to use of the step 72 and flange 68 to sealably attach the upstream support plate to the downstream plate 30. Other sealable attachment means known to those skilled in the art may be used without deviating from the teachings of the present invention.

FIG. 2 illustrates a perspective view of an upper portion of one embodiment of an assembled modular cyclone block 12, consistent with the present invention. The cyclone separator cells 14 are shown in an assembled state with portions of the clean air takeoff tubes 32 received into an interior portion of the circular flow tubes 22. Visible near the upstream support plate 26 are components of the swirl inducing structure 16, depicted as an air directing vane structure provided in the interior of the circular flow tubes 22. Also visible is a seal flange 70 provided circumferentially around the perimeter of the downstream support plate 30. Advantageously, a step 74 is provided on boundary between the seal flange 70 and the downstream support plate 30, the step permitting the downstream support plate 30 to be closely fitted into a modular cyclone block receiving opening in the precleaner housing, (such as the housing illustrated in FIG. 3). The ramped skirt 20 as well as a portion of the swirl inducing structure 16 as provided in an upstream end 24 of the cyclone separator cells 14 is also visible. As noted earlier above, the invention is not limited to use of the step 72 and flange 68 to sealably attach the upstream support plate to the downstream plate 30. Other sealable attachment means known to those skilled in the art may be used without deviating from the teachings of the present invention. In alternate embodiments is it envisioned that the attachment means may include vibration welding, hot plate welding, ultrasonic welding, infrared welding as well as adhesives, to name only a few.

As further illustrated in FIGS. 2, 1A and 1B, each assembled cyclone cell 14 includes a particulate discharge port 28 through which particulates removed by the cyclone cells 14 are ejected due to the action of centrifugal force on the swirling gas stream. Such particulates are directed by a housing discussed with FIG. 3 below.

Figure 3:
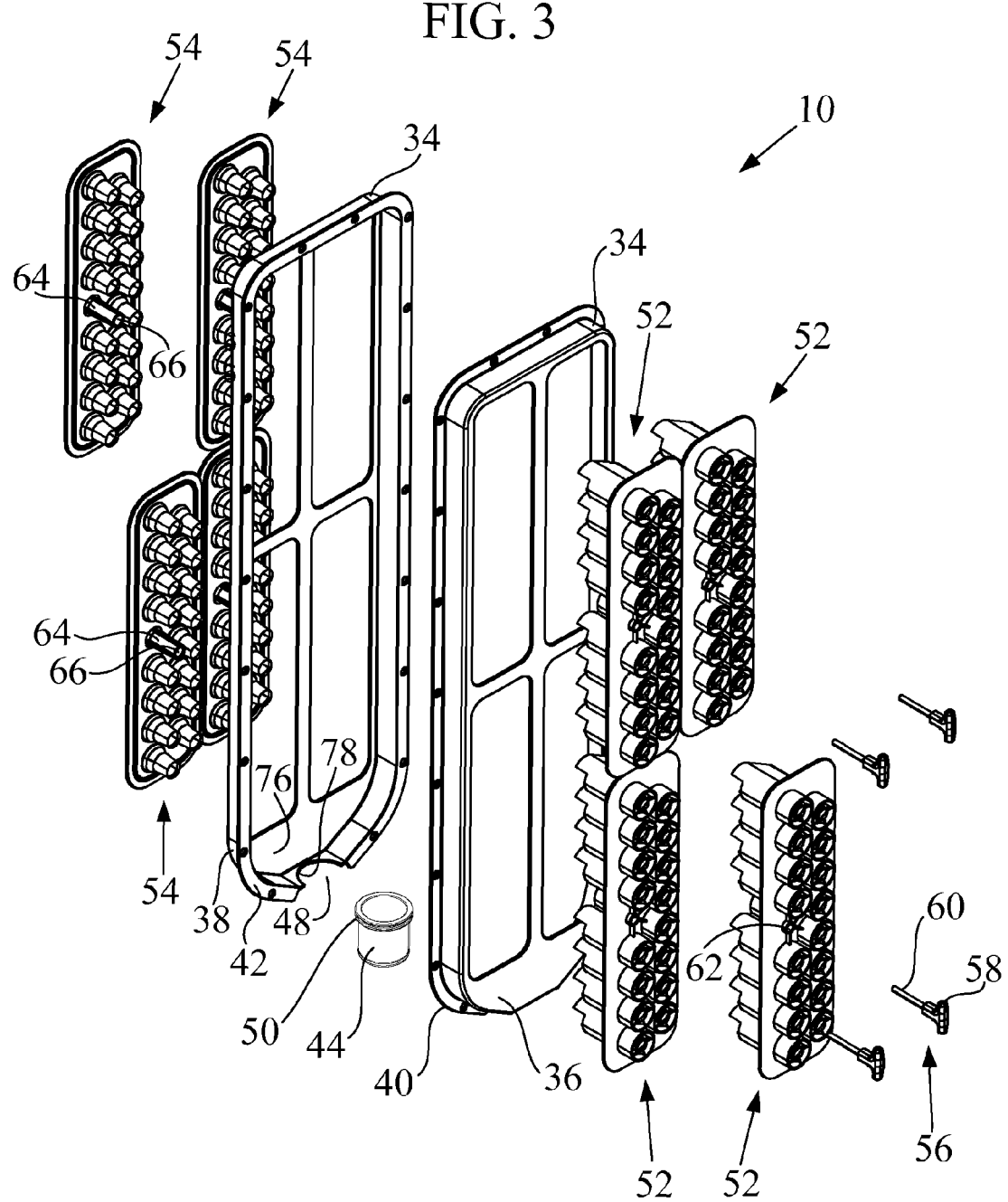
FIG. 3 illustrates an exploded/assembly view of one embodiment of the modular cyclone precleaner system, consistent with the present invention.

FIG. 3 illustrates an assembly view of one possible exemplary embodiment of a modular cyclone precleaner system 10, consistent with the present invention. The precleaner system 10 includes an exemplary housing 34 configured to receive one or more modular cyclone blocks (four blocks in the illustrated embodiment). Cyclone blocks may be, for example, variations of exemplary modular cyclone block 12 discussed earlier. As discussed earlier, reusable modular cyclone blocks may be provided in various sizes having differing arrangements and types of cyclone cells designed to meet airflow and particulate removal requirements. Embodiments of the invention are not limited to configurations shown in the illustrations as the illustrations are provided solely to provide the reader with one exemplary configuration for better understanding of the invention. Modular cyclone blocks may be provided in any suitable size for embodying any desired number of cyclone separator cells 14 into a modular reusable unit in standardized sizes. The housing 34 may alternately be configured to receive modular cyclone blocks of two or more sizes, or alternately all modular cyclone blocks may be of the same shape and size such as in the exemplary illustration of FIG. 3.

Preferably, the housing is formed of two half housing portions 36 and 38 with each half housing portion having a symmetric design such that both housing halves 36 and 38 may be formed or molded using the same tool or mold, thereby reducing production tooling costs for low volume production programs. In the embodiment illustrated in FIG. 3, the housing halves 36 and 38 may mount together along mating flanges 40 and 42 to define a particulate collection chamber 76 having a circular outlet opening 48 configured to retentively mount a scavenge port 44 or aspirator port used to remove separated particulates from the modular cyclone precleaner system 10. The scavenge port 44 includes a circumferential capture groove 50 configured to receive and mountably engage the housing halves 36 and 38 along the rim 78 of the circular outlet opening 48. In some embodiments, the scavenge port 44 could be split into two portions with one of each portion included in each housing half 36, 38.

In an alternate embodiment, housing half 36 may be replaced by cutouts provided in the body exterior or sheet metal of the vehicle (for example a tractor), the cutouts configured to receive the first cyclone blocks 52. In this alternate embodiment, the second housing half 38 mounts onto the inside surface of the vehicle exterior and is aligned to engage the first cyclone block half 52 with the second cyclone block half 54 secured to the second housing half 38.

After the housing halves 36 and 38 are assembled to form the housing 34, individual modular cyclone blocks 12 (see FIG. 2) may be secured to the housing to form a finished modular cyclone precleaner system 10. As discussed earlier, advantageously components such as the modular cyclone blocks 12 and the scavenge port 44 or aspirator port can be shared across differing modular cyclone precleaner systems to minimize tooling costs and provide standardization of reusable components.

In at least one embodiment of the invention, the removable modular cyclone blocks 12 may be individually and removably secured to the housing 34 using any of a variety of fastening devices 56, such as threaded fasteners such bolts and screws, twist lock clamps, any of a variety of clips, etc as would be known to one skilled in the art without deviating from the disclosure of the present invention. In at least one embodiment, fastening devices 56 may comprise T-handled bolts (or T-bolts). T-bolts 56 each have an elongated cylindrical body having a threaded portion 60 provided at one end and a T-handle 58 provided at an opposing end. In the exemplary embodiment depicted in FIG. 3, the second cyclone half block 54 includes a T-bolt engagement member 64 secured thereto, such as onto the downstream support plate 30. The T-bolt engagement member 64 includes a threaded receptacle 66 sized and configured to threadably engage the threaded portion 60 of the T-bolts 56. The first cyclone block half includes an aperture 62 sized, configured and aligned to receive a portion of a T-bolt 56 therethrough so as to removably and mountably engage the T-bolt engagement member 64. The handle 58 of the T-bolts 56 permit the T-bolts to be tightened by hand so as to compressibly mount the first 52 and second 54 block half portions together and onto the housing 34 to form an assembled modular cyclone block 12 (as depicted and discussed with FIG. 2 earlier) mounted to housing 34. The T-bolts 56 may also be operated to permit removal of at least one of the cyclone block halves (52, 54) for servicing.

Figure 4:
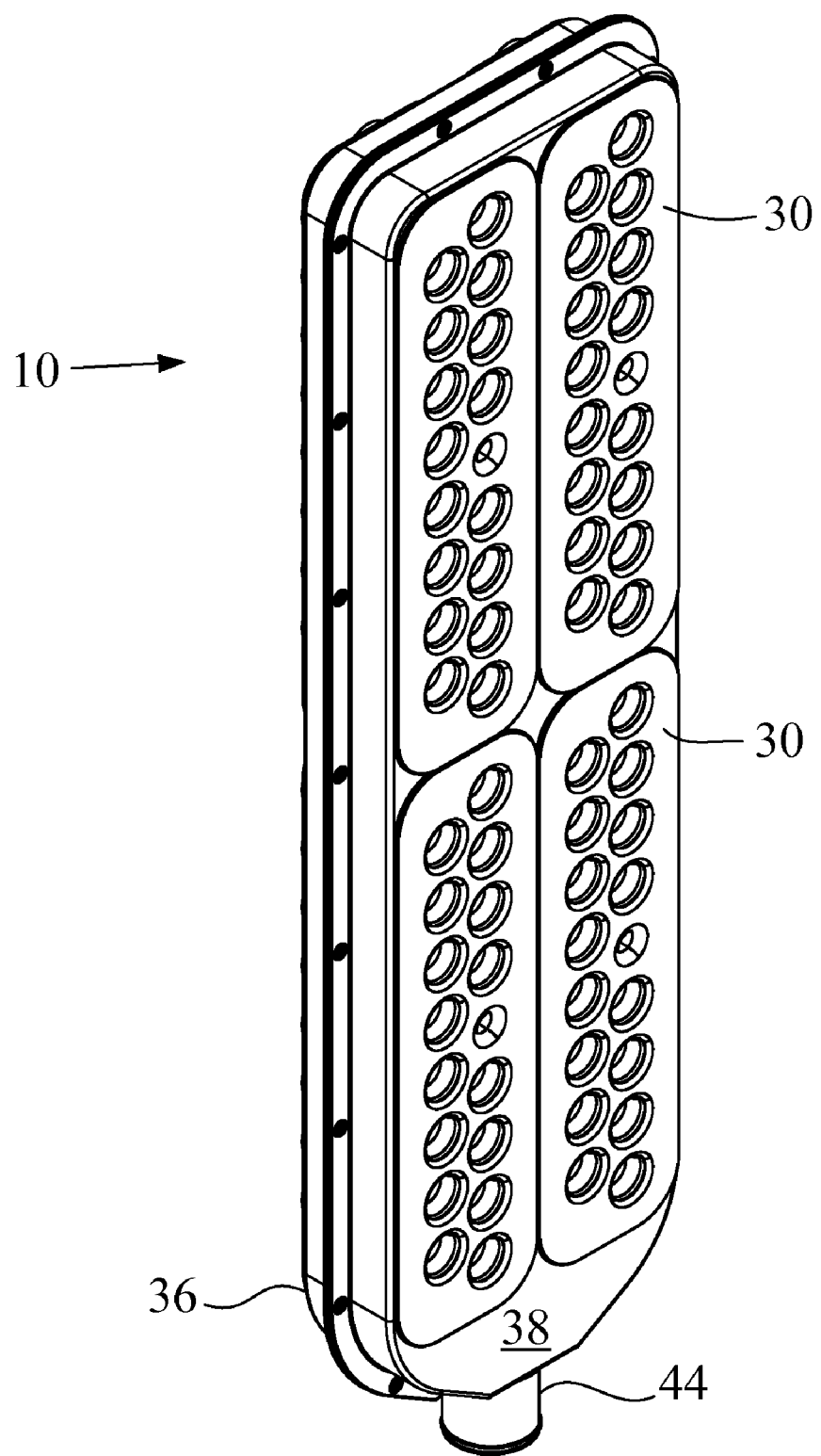
FIG. 4 illustrates a perspective view of an exemplary embodiment of a fully assembled modular cyclone precleaner system, consistent with the present invention.

FIG. 4 depicts a perspective view of a fully assembled modular cyclone precleaner system 10, assembled as discussed with FIG. 3 above.

The modular cyclone precleaner system 10 may be used in conjunction with an air cleaner/air filter assembly. In other applications, the modular cyclone precleaner system 10 may be utilized separate from an air cleaner or air filter, such as in certain dust removal and sweeper applications. Typical applications for the modular cyclone precleaner technology include, but are not limited to, on and off highway engines, compressors and stationary engines. These applications generally have smaller production volumes, which limit the amount of the tooling investment for a successful acquisition of business in a competitive bidding environment. The modular cyclone precleaner technology of the present invention enables the use of modular standardized components across several different applications, with differing vehicles and customers while also allowing each customer to have a custom solution that meets their specified requirements at reduced cost when compared to prior art systems. Advantageously, the modular cyclone precleaner system 10 allows the flexibility to select and configure the first and second cyclone block halves (52 and 54) to meet a wide variety of packaging requirements.

In one aspect of the invention, a ramped skirt 20 may be provided over cyclone separator cells positioned at the upper portion of the modular cyclone block 12. The ramped skirt 20 is configured to channel particulates to the side of the modular cyclone block 12 to be carried away to the outlet opening 48 of the housing 34. In FIG. 2 the particulates would be channeled to the right side of the modular cyclone block 12 and away from the cyclone separator cells 14 in the block 12. Advantageously, the ramped skirt 20 helps to eject larger particulates and debris as may be encountered in agricultural or construction applications. Advantageously, the ramped skirt 20 facilitates the stacking of additional modular cyclone blocks 12 one above the other by deflecting particulates falling from other modular cyclone blocks.

While the best modes for carrying out the invention have been described in detail, those familiar with the art to which this invention relates will recognize various alternative designs and embodiments for practicing the invention within the scope of the appended claims.

The invention claimed is:

1. A modular cyclone precleaner system comprising:
   a precleaner housing including
      a first housing half having a plurality of openings; and
      a second housing half having a plurality of openings;
      wherein said housing halves are mated together forming said precleaner housing, said mated housing halves forming a particulate collection chamber within said precleaner housing and a particulate outlet extending from said particulate collection chamber to an exterior of said precleaner housing;
      wherein said housing halves are symmetric and interchangeable with each other, enabling said halves to be produced by a shared mold tool;
   at least one modular cyclone block installable into one or more of said openings of said precleaner housing, each of said modular cyclone blocks including
      an upstream support plate installed onto said first housing half covering one of said a plurality of openings of said first housing half, said upstream support plate including
         a plurality of first cyclone block halves secured to said upstream support plate;
      a downstream support plate installed onto said second housing half covering one of said a plurality of openings of said second housing half, said downstream support plate including
         a plurality of second cyclone block halves secured to said downstream support plate, each of said second cyclone block halves including a clean air takeoff tube;
      wherein said clean air takeoff tubes of said second cyclone block halves are received into an interior of respective ones of said first cyclone block halves;
      wherein said first cyclone block halves of said upstream support plate with said second cyclone block halves of said downstream support plate cooperate to form a plurality of cyclone separator cells, each of said cyclone separator cells having a particulate discharge port for particulates removed from an intake gas stream;
      wherein said precleaner housing is configured to capture particulates from said discharge ports.

2. The modular cyclone precleaner of claim 1, wherein at least one of said modular cyclone blocks includes a ramped skirt configured to channel particulates towards a side region of the modular cyclone block and away from said cyclone separator cells;
   wherein said ramped skirt connects to and bridges between topmost cyclone separator cells of said at least one of said modular cyclone blocks.

3. The modular cyclone precleaner of claim 1, wherein said cyclone separator cells each comprise:
   an upstream end for receiving said intake gas stream;
   a downstream end for discharging a cleaned output gas stream; and
   a swirl inducing structure for imparting centrifugal forces onto said particulates in said intake gas stream.

4. The modular cyclone precleaner of claim 1, wherein said first cyclone block half is removably secured to said precleaner housing; and
   wherein said second cyclone block half is secured to said precleaner housing by any of: vibration welding, infrared welding, hot plate welding, or adhesives.

5. The modular cyclone precleaner of claim 1, further comprising at least one fastening device configured and adapted to removably secure said modular cyclone blocks to said precleaner housing.

6. The modular cyclone precleaner of claim 5, wherein said at least one fastening device is at least one threaded bolt.

7. The modular cyclone precleaner of claim 5, wherein said at least one fastening device is at least one T-bolt having an elongated cylindrical body, a threaded portion provided at a first end and a T-handle provided at an opposing second end;
   wherein said cyclone precleaner further includes an aperture in one of said modular cyclone block housing halves sized and configured to receive a portion of said T-bolt therethrough; and
   wherein said cyclone precleaner also includes a T-bolt engagement member secured to a different modular cyclone block housing half, configured and aligned to threadably engage said threaded portion of said T-handle.

8. A method of producing a precleaner system from modular cyclone blocks comprising:
   choosing modular cyclone blocks according to air flow and particulate removal requirements of an application;
   providing a first housing half having a plurality of openings;
   providing a second housing half having a plurality of openings, wherein said housing halves are symmetric and interchangeable with each other, enabling said halves to be produced by a shared mold tool;
   mating said housing halves together to form a precleaner housing, said mated housing halves forming a particulate collection chamber within and a particulate outlet extending from said particulate collection chamber to an exterior of said precleaner housing; and
   installing said cyclone blocks into said housing.

9. The method of claim 8, wherein said installing step is practiced by:
   placing a first half of said modular cyclone blocks into position onto said first housing half;
   placing a second half of said modular cyclone blocks into position onto said second housing half; and
   securing said modular cyclone blocks halves together and onto said precleaner housing using threaded fasteners.

* * * * *